United States Patent
Liu et al.

(10) Patent No.: US 12,058,780 B2
(45) Date of Patent: Aug. 6, 2024

(54) METHODS, TRANSMITTER DEVICE AND RECEIVER DEVICE FOR COMMUNICATION OF MAC PDU

(71) Applicant: Telefonaktiebolaget LM Ericsson (publ), Stockholm (SE)

(72) Inventors: Jinhua Liu, Beijing (CN); Jose Luis Pradas, Stockholm (SE); Ajmal Muhammad, Sollentuna (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 385 days.

(21) Appl. No.: 17/425,568

(22) PCT Filed: Oct. 22, 2019

(86) PCT No.: PCT/CN2019/112582
§ 371 (c)(1),
(2) Date: Jul. 23, 2021

(87) PCT Pub. No.: WO2020/155677
PCT Pub. Date: Aug. 6, 2020

(65) Prior Publication Data
US 2022/0095415 A1    Mar. 24, 2022

(30) Foreign Application Priority Data
Jan. 30, 2019    (WO) ................. PCT/CN2019/073991

(51) Int. Cl.
*H04W 80/02*    (2009.01)
*H04L 5/00*    (2006.01)

(52) U.S. Cl.
CPC ........... *H04W 80/02* (2013.01); *H04L 5/0053* (2013.01); *H04L 5/0094* (2013.01)

(58) Field of Classification Search
None
See application file for complete search history.

(56) References Cited

U.S. PATENT DOCUMENTS 10,419,343 B2 *   9/2019  Lee ..................... H04L 1/0079
2016/0212737 A1   7/2016  Jang et al.
(Continued)

FOREIGN PATENT DOCUMENTS

CN    106209318 A    12/2016
CN    107637001 A    1/2018
(Continued)

OTHER PUBLICATIONS

Extended European Search Report mailed Aug. 18, 2022 for European Patent Application No. 19912846.3, 8 pages.
(Continued)

*Primary Examiner* — Brian S Roberts
(74) *Attorney, Agent, or Firm* — Sage Patent Group

(57) ABSTRACT

Methods, a transmitter device and a receiver device are provided for communication of media access control (MAC) protocol data unit (PDU). According to an embodiment, the transmitter device determines an MAC PDU including an MAC subheader and transmits the MAC PDU to a receiver device. The MAC subheader includes a second logical channel identity (LCID) field which is an extension of a first LCID field. A presence of the second LCID field is indicated by an indicator that is included in the MAC subheader.

18 Claims, 17 Drawing Sheets

(56) References Cited

U.S. PATENT DOCUMENTS

| | | | |
|---|---|---|---|
| 2018/0316610 A1* | 11/2018 | Lee | H04L 1/0079 |
| 2020/0007274 A1* | 1/2020 | Folke | H04W 74/004 |
| 2020/0351754 A1* | 11/2020 | Kim | H04W 48/02 |
| 2022/0078872 A1* | 3/2022 | Shrestha | H04W 76/30 |

FOREIGN PATENT DOCUMENTS

| | | |
|---|---|---|
| CN | 108292982 A | 7/2018 |
| TW | 201828678 A | 8/2018 |
| WO | 2016168342 A1 | 10/2016 |
| WO | 2018/142366 A1 | 8/2018 |

OTHER PUBLICATIONS

KDDI Corporation; "Test Proposal for FFS Resolution"; 3GPP TSG-RAN WG3 #102; R2-1816881; Spokane, WA, USA; Nov. 12-16, 2018; 19 pages.

International Search Report and Written Opinion of the International Searching Authority, PCT/CN2019/112582, mailed Dec. 30, 2019, 6 pages.

Office Action mailed Sep. 25, 2020 for Taiwanese Patent Application No. 10920918160, 16 pages.

\* cited by examiner

| R=1 | F | new LCID part 1 |
|---|---|---|
| new LCID part 2 ||||
| L ||||

FIG. 7A

| R=1 | F | new LCID part 1 |
|---|---|---|
| new LCID part 2 ||||
| L ||||
| L ||||

FIG. 7B

| R=1 | F | new LCID part 1 |
|---|---|---|
| L ||||
| new LCID Part 2 ||||

FIG. 8A

| R=1 | F | new LCID part 1 |
|---|---|---|
| L ||||
| L ||||
| new LCID part 2 ||||

FIG. 8B

METHODS, TRANSMITTER DEVICE AND RECEIVER DEVICE FOR COMMUNICATION OF MAC PDU

TECHNICAL FIELD

Embodiments of the disclosure generally relate to wireless communication, and, more particularly, to methods, a transmitter device and a receiver device for communication of media access control (MAC) protocol data unit (PDU).

BACKGROUND

This section introduces aspects that may facilitate better understanding of the present disclosure. Accordingly, the statements of this section are to be read in this light and are not to be understood as admissions about what is in the prior art or what is not in the prior art.

FIG. 1 is a reference diagram showing an integrated access backhaul (IAB) architecture in standalone mode, which contains one IAB-donor and multiple IAB-nodes. The IAB-donor is connected to the core network (CN) and the user equipments (UEs) can access the IAB-donor or IAB-nodes. The IAB-donor is treated as a single logical node that comprises a set of functions such as next generation node B (gNB)-distributed unit (DU), gNB-centralized unit (CU)-control plane (CP), gNB-CU-user plane (UP) and potentially other functions. In deployment, the IAB-donor can be split according to these functions, which can all be either collocated or non-collocated as allowed by the 3rd generation partnership project (3GPP) next generation-radio access network (NG-RAN) architecture.

Furthermore, as shown in FIG. 2, the following link types are supported for IAB: access link and backhaul link. The access link is a link between an access UE and an IAB-node or IAB-donor (e.g. $L_{A,DL}$ or $L_{A,UL}$). The backhaul link is a link between an IAB-node and an IAB child node (e.g. $L_{C,DL}$ or $L_{C,UL}$) or an IAB parent node (e.g. $L_{P,DL}$ or $L_{P,UL}$).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for communication of MAC PDU.

According to a first aspect of the disclosure, there is provided a method implemented at a transmitter device. The method may comprise determining an MAC PDU comprising an MAC subheader and transmitting the MAC PDU to a receiver device. The MAC subheader may include a second logical channel identity (LCID) field which is an extension of a first LCID field. A presence of the second LCID field may be indicated by an indicator that is included in the MAC subheader.

In this way, the communication of MAC PDU with LCID extension can be facilitated.

In an embodiment of the disclosure, the indicator may be another field in the MAC subheader.

In an embodiment of the disclosure, the another field may be a reserved bit which is redefined as the indicator to indicate the presence of the second LCID field.

In an embodiment of the disclosure, the redefined reserved bit may use a first predefined value to indicate the presence of the second LCID field In an embodiment of the disclosure, the another field may be the first LCID field that has a second predefined value to indicate the presence of the second LCID field.

In an embodiment of the disclosure, the MAC subheader may include no first LCID field, and the second LCID field may occupy a position of the first LCID field and one or more additional bits.

In an embodiment of the disclosure, the MAC subheader may include the first LCID field, and the second LCID field may occupy one or more additional bits.

In an embodiment of the disclosure, a number of the one or more additional bits may be predefined in the transmitter device or preconfigured from outside.

In an embodiment of the disclosure, the second LCID field may include a first length indicator that indicates a length of the second LCID field.

In an embodiment of the disclosure, a number of the one or more additional bits may be indicated by the first LCID field with a third predefined value, or may be predefined in the transmitter device or preconfigured from outside.

In an embodiment of the disclosure, the first LCID field may be configured such that it is to be ignored by the receiver device in response to the reserved bit having the first predefined value.

In an embodiment of the disclosure, the one or more additional bits may be disposed immediately after the position of the first LCID field. Alternatively, the one or more additional bits may be disposed immediately after a second length indicator that indicates a total length of the one or more additional bits and a service data unit (SDU) or a control element (CE) of the MAC PDU.

In an embodiment of the disclosure, bits disposed in the position of the first LCID field may be most significant bits (MSBs) of the second LCID field and the one or more additional bits may be least significant bits (LSBs) of the second LCID field.

In an embodiment of the disclosure, bits disposed in the position of the first LCID field may be LSB s of the second LCID field and the one or more additional bits may be MSBs of the second LCID field.

In an embodiment of the disclosure, the second LCID field may occupy a position of the first LCID field and the reserved bit may be redefined as a portion of the second LCID field. An LCID value carried by the MAC subheader may be indicated jointly by bits disposed in the position of the first LCID field and the redefined reserved bit.

In an embodiment of the disclosure, the position of the redefined reserved bit may be separated from the position of the first LCID filed. Alternatively, the position of the redefined reserved bit may be disposed immediately before the position of the first LCID filed.

In an embodiment of the disclosure, a length of the first LCID field may be n bits where n is an integer greater than one. The MAC PDU comprising the MAC subheader may be determined when an LCID value to be carried by the MAC subheader is greater than $2^n-1$.

In an embodiment of the disclosure, an LCID value carried by the MAC subheader may be a value indicated by the second LCID field plus $2^n$.

In an embodiment of the disclosure, the integer n may be 6.

In an embodiment of the disclosure, each of the transmitter device and the receiver device may be an IAB node or a terminal device.

According to a second aspect of the disclosure, there is provided a method implemented at a receiver device. The method may comprise receiving, from a transmitter device, an MAC PDU comprising an MAC subheader. The method may further comprise determining, from the MAC subheader, a second LCID field which is an extension of a first LCID field. A presence of the second LCID field may be determined based on an indicator that is included in the MAC subheader.

In this way, the communication of MAC PDU with LCID extension can be facilitated.

In an embodiment of the disclosure, the indicator may be another field in the MAC subheader.

In an embodiment of the disclosure, the another field may be a reserved bit which is redefined as the indicator to indicate the presence of the second LCID field.

In an embodiment of the disclosure, the redefined reserved bit may use a first predefined value to indicate the presence of the second LCID field.

In an embodiment of the disclosure, the another field may be the first LCID field that has a second predefined value to indicate the presence of the second LCID field.

In an embodiment of the disclosure, the MAC subheader may include no first LCID field, and the second LCID field may occupy a position of the first LCID field and one or more additional bits.

In an embodiment of the disclosure, the MAC subheader may include the first LCID field, and the second LCID field may occupy one or more additional bits.

In an embodiment of the disclosure, a number of the one or more additional bits may be predefined in the receiver device or preconfigured from outside.

In an embodiment of the disclosure, the second LCID field may include a first length indicator that indicates a length of the second LCID field.

In an embodiment of the disclosure, a number of the one or more additional bits may be indicated by the first LCID field with a third predefined value, or may be predefined in the receiver device or preconfigured from outside.

In an embodiment of the disclosure, the first LCID field may be ignored by the receiver device in response to the reserved bit having the first predefined value.

In an embodiment of the disclosure, the one or more additional bits may be disposed immediately after the position of the first LCID field. Alternatively, the one or more additional bits may be disposed immediately after a second length indicator that indicates a total length of the one or more additional bits and an SDU or a CE of the MAC PDU.

In an embodiment of the disclosure, bits disposed in the position of the first LCID field may be MSBs of the second LCID field and the one or more additional bits may be LSBs of the second LCID field.

In an embodiment of the disclosure, bits disposed in the position of the first LCID field may be LSB s of the second LCID field and the one or more additional bits may be MSBs of the second LCID field.

In an embodiment of the disclosure, the second LCID field may occupy a position of the first LCID field and the reserved bit may be redefined as a portion of the second LCID field. Alternatively, an LCID value carried by the MAC subheader may be indicated jointly by bits disposed in the position of the first LCID field and the redefined reserved bit.

In an embodiment of the disclosure, the position of the redefined reserved bit may be separated from the position of the first LCID filed. Alternatively, the position of the redefined reserved bit may be disposed immediately before the position of the first LCID filed.

In an embodiment of the disclosure, a length of the first LCID field may be n bits where n is an integer greater than one. An LCID value carried by the MAC subheader may be a value indicated by the second LCID field plus $2^n$.

In an embodiment of the disclosure, the integer n may be 6.

According to a third aspect of the disclosure, there is provided a transmitter device. The transmitter device may comprise at least one processor and at least one memory. The at least one memory may contain instructions executable by the at least one processor, whereby the transmitter device may be operative to determine an MAC PDU comprising an MAC subheader and transmit the MAC PDU to a receiver device. The MAC subheader may include a second LCID field which is an extension of a first LCID field. A presence of the second LCID field may be indicated by an indicator that is included in the MAC subheader.

In an embodiment of the disclosure, the transmitter device may be operative to perform the method according to the above first aspect.

According to a fourth aspect of the disclosure, there is provided a receiver device. The receiver device may comprise at least one processor and at least one memory. The at least one memory may contain instructions executable by the at least one processor, whereby the receiver device may be operative to receive, from a transmitter device, an MAC PDU comprising an MAC subheader. The receiver device may be further operative to determine, from the MAC subheader, a second LCID field which is an extension of a first LCID field. A presence of the second LCID field may be determined based on an indicator that is included in the MAC subheader.

In an embodiment of the disclosure, the receiver device may be operative to perform the method according to the above second aspect.

According to a fifth aspect of the disclosure, there is provided a computer program product. The computer program product may comprise instructions which when executed by at least one processor, cause the at least one processor to perform the method according to the above first or second aspect.

According to a sixth aspect of the disclosure, there is provided a computer readable storage medium. The computer readable storage medium may comprise instructions which when executed by at least one processor, cause the at least one processor to perform the method according to the above first or second aspect.

According to a seventh aspect of the disclosure, there is provided a transmitter device. The transmitter device may comprise a determination module for determining an MAC PDU comprising an MAC subheader. The transmitter device may further comprise a transmission module for transmitting the MAC PDU to a receiver device. The MAC subheader may include a second LCID field which is an extension of a first LCID field. A presence of the second LCID field may be indicated by an indicator that is included in the MAC subheader.

According to an eighth aspect of the disclosure, there is provided a receiver device. The receiver device may comprise a reception module for receiving, from a transmitter device, an MAC PDU comprising an MAC subheader. The receiver device may further comprise a determination module for determining, from the MAC subheader, a second LCID field which is an extension of a first LCID field. A presence of the second LCID field may be determined based on an indicator that is included in the MAC subheader.

According to an ninth aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may determine an MAC PDU comprising an MAC subheader and transmit the MAC PDU to the terminal device. The MAC subheader may include a second LCID field which is an extension of a first LCID field. A presence of the second LCID field may be indicated by an indicator that is included in the MAC subheader.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to an tenth aspect of the disclosure, there is provided a communication system including a host computer. The host computer may comprise processing circuitry configured to provide user data and a communication interface configured to forward the user data to a cellular network for transmission to a terminal device. The cellular network may comprise a base station having a radio interface and processing circuitry. The base station's processing circuitry may be configured to determine an MAC PDU comprising an MAC subheader and transmit the MAC PDU to a receiver device. The MAC subheader may include a second LCID field which is an extension of a first LCID field. A presence of the second LCID field may be indicated by an indicator that is included in the MAC subheader.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to an eleventh aspect of the disclosure, there is provided a method implemented in a communication system including a host computer, a base station and a terminal device. The method may comprise, at the host computer, receiving, from the base station, user data originating from a transmission which the base station has received from the terminal device. The base station may receive, from a terminal device, an MAC PDU comprising an MAC subheader and determine, from the MAC subheader, a second LCID field which is an extension of a first LCID field. A presence of the second LCID field may be determined based on an indicator that is included in the MAC subheader.

In an embodiment of the disclosure, the method may further comprise, at the base station, receiving the user data from the terminal device.

In an embodiment of the disclosure, the method may further comprise, at the base station, initiating a transmission of the received user data to the host computer.

According to an twelfth aspect of the disclosure, there is provided a communication system including a host computer comprising a communication interface configured to receive user data originating from a transmission from a terminal device to a base station. The base station may comprise a radio interface and processing circuitry. The base station's processing circuitry may be configured to receive, from a transmitter device, an MAC PDU comprising an MAC subheader and determine, from the MAC subheader, a second LCID field which is an extension of a first LCID field. A presence of the second LCID field may be determined based on an indicator that is included in the MAC subheader.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application. The terminal device may be configured to execute a client application associated with the host application, thereby providing the user data to be received by the host computer.

According to an thirteenth aspect of the disclosure, there is provided a method implemented in a communication system including a transmitter device and a receiver device. The method may comprise, at the transmitter device, determining an MAC PDU comprising an MAC subheader. The method may further comprise, at the transmitter device, transmitting the MAC PDU to the receiver device. The MAC subheader may include a second LCID field which is an extension of a first LCID field. A presence of the second LCID field may be indicated by an indicator that is included in the MAC subheader. The method may further comprise, at the receiver device, receiving, from the transmitter device, the MAC PDU comprising the MAC subheader. The method may further comprise, at the receiver device, determining, from the MAC subheader, the second LCID field. A presence of the second LCID field may be determined based on the indicator that is included in the MAC subheader.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIGS. 7A-7B show an example of MAC subheaders for the first embodiment;

FIGS. 8A-8B show an example of MAC subheaders for the first embodiment;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
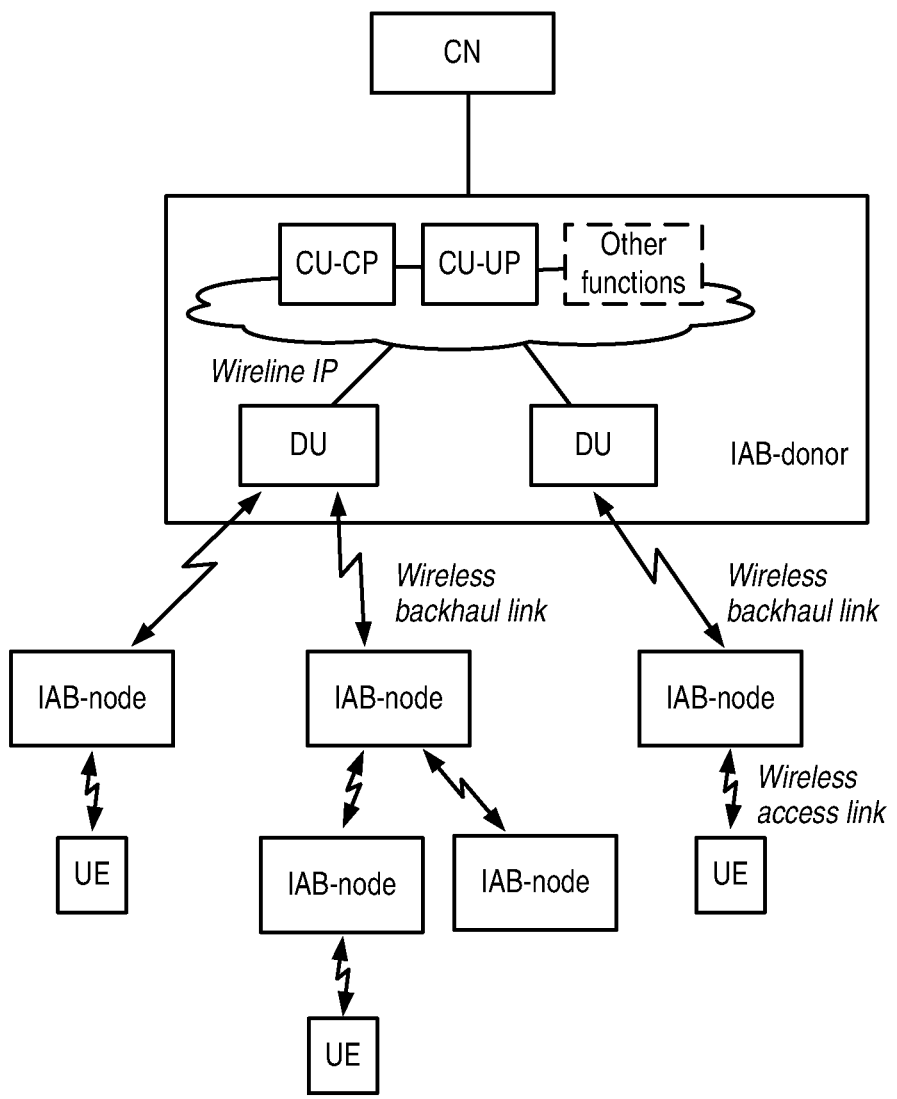
FIG. 1 is a diagram showing an IAB architecture.
Figure 2:
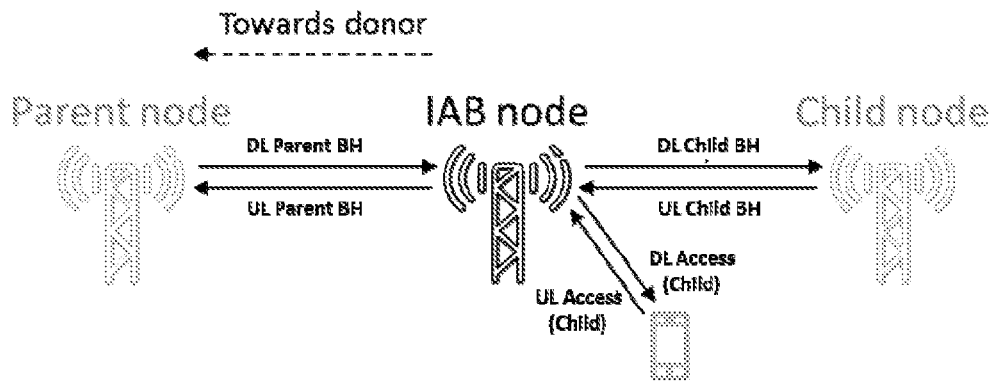
FIG. 2 is a diagram showing different IAB link types.
Figure 3:
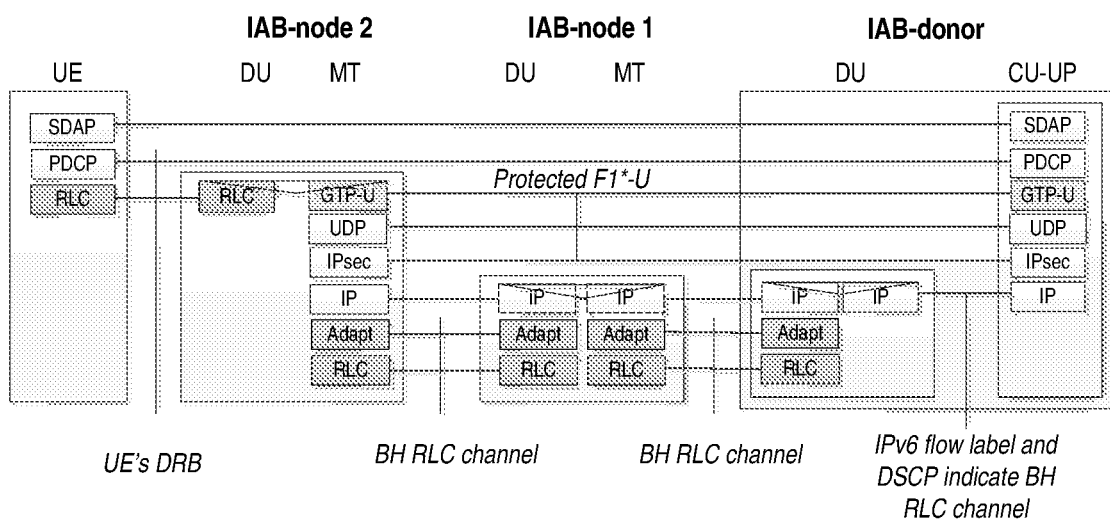
FIG. 3 shows a user plane protocol stack for an IAB architecture.
Figure 4:
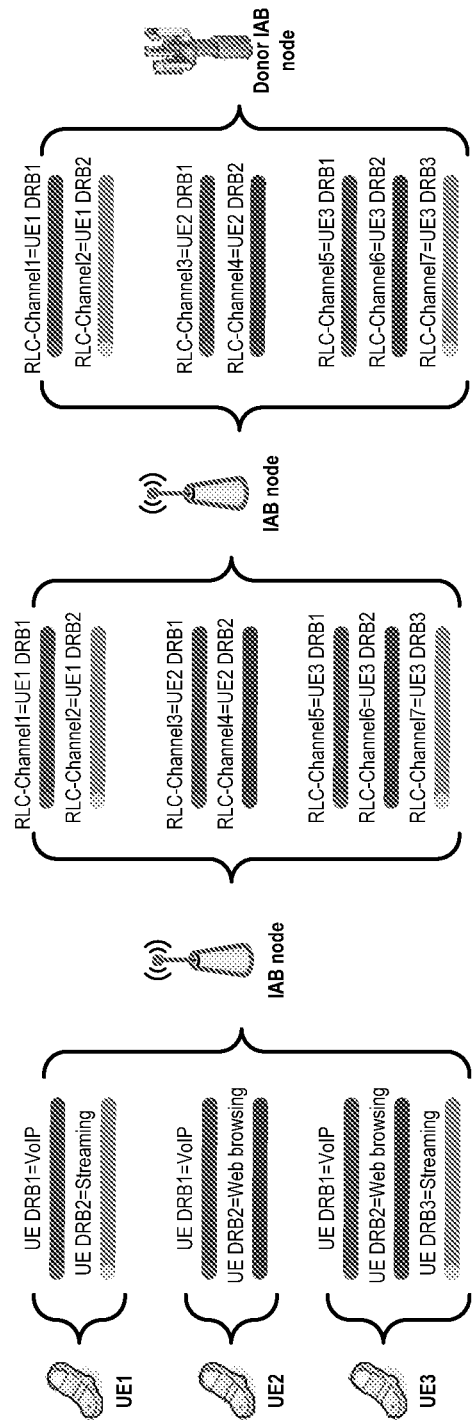
FIG. 4 shows one-to-one mapping between UE DRB and BH RLC-Channel.
Figure 5:
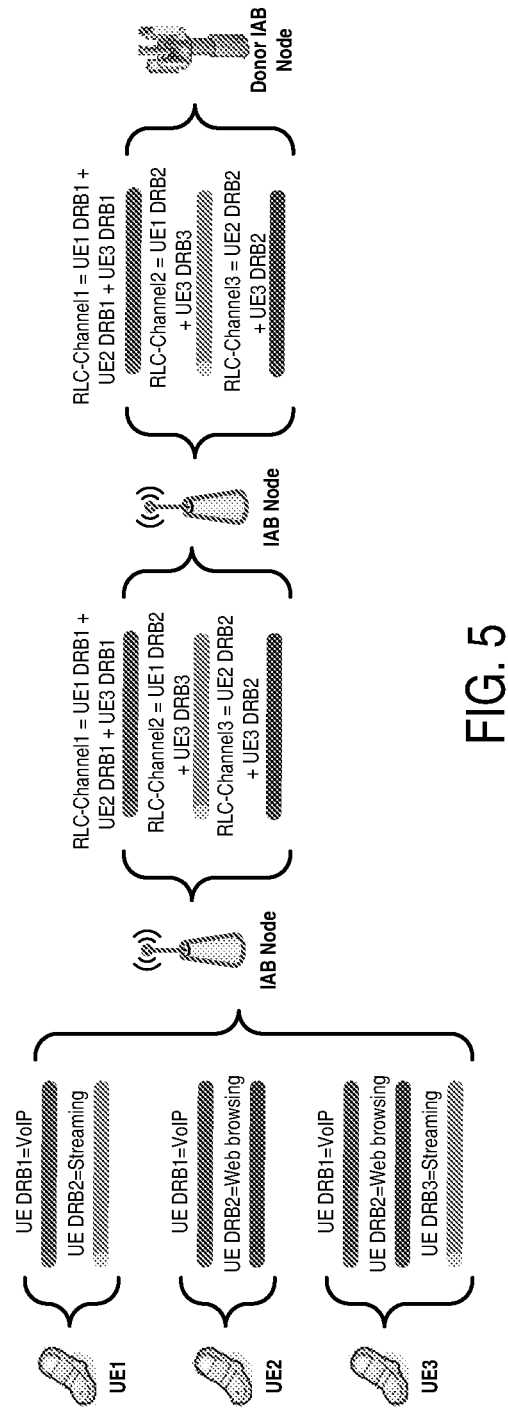
FIG. 5 shows many-to-one mapping between UE DRBs and BH RLC-channel.

FIG. 3 shows a user plane (UP) protocol stack for an IAB architecture. The term "MT" refers to mobile termination which is a function residing on an IAB-node that terminates the radio interface layers of the backhaul Uu interface toward the IAB-donor or other IAB-nodes. As shown in FIG. 3, a data radio bear (DRB) of the UE corresponds to a backhaul (BH) radio link control (RLC)-channel. The correspondence therebetween may be one-to-one mapping as shown in FIG. 4 or many-to-one mapping as shown in FIG. 5. In the option of FIG. 4, each UE DRB is mapped onto a separate BH RLC-channel. Further, each BH RLC-channel is mapped onto a separate BH RLC-channel on the next hop. The number of established BH RLC-channels is equal to the number of established UE DRBs. Thus, the number of RLC-channels needs to be enhanced in the one-to-one mapping option.

In the option of FIG. 5, several UE DRBs are multiplexed onto a single BH RLC-channel based on specific parameters such as bearer quality of service (QoS) profile. Other information such as hop-count could also be configured. The IAB-node can multiplex UE DRBs into a single BH RLC-channel even if they belong to different UEs. Furthermore, a packet from one BH RLC-channel may be mapped onto a different BH RLC-channel on the next hop. All traffic mapped to a single BH RLC-channel receives the same QoS treatment on the air interface. Furthermore, for many-to-one mapping, the existing number of RLC-channels might be sufficient.

Figure 6A:
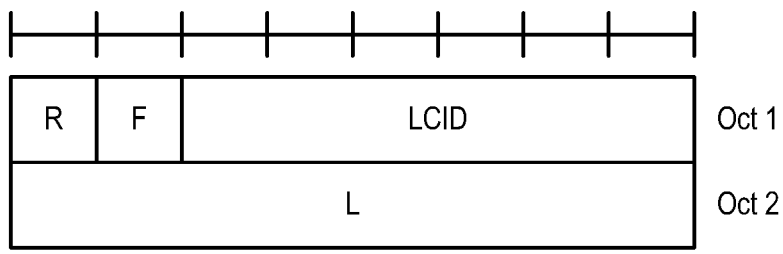
FIGS. 6A-6C show structures of existing MAC subheaders.

According to section 6.1.2 of 3GPP technical specification (TS) 38.321 V15.3.0, a media access control (MAC) protocol data unit (PDU) consists of one or more MAC subPDUs. Each MAC subPDU consists of one of the following: 1) an MAC subheader only (including padding); 2) an MAC subheader and an MAC service data unit (SDU); 3) an MAC subheader and an MAC control element (CE); 4) an MAC subheader and padding. The MAC SDUs are of variable sizes. Each MAC subheader corresponds to either an MAC SDU, an MAC CE, or padding. There are 3 types of MAC subheaders defined. An MAC subheader except for fixed sized MAC CE, padding, and an MAC SDU containing uplink (UL) common control channel (CCCH) consists of four header fields R/F/LCID/L, as shown in FIG. 6A (with 8-bit L field) and FIG. 6B (with 16-bit L field). An MAC subheader for fixed sized MAC CE, padding, and an MAC SDU containing UL CCCH consists of two header fields R/LCID, as shown in FIG. 6C.

Figure 6B:
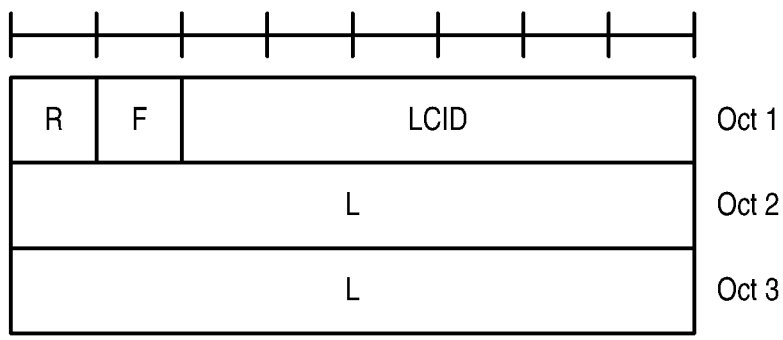
Figure 6C:
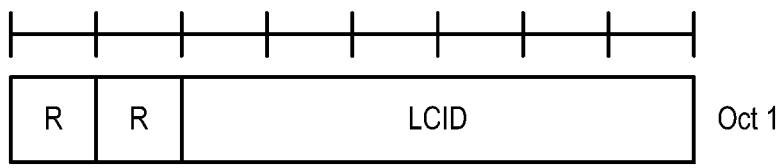

In FIGS. 6A-6C, the LCID field refers to logical channel identity (ID) field. It identifies the logical channel instance of the corresponding MAC SDU or the type of the corresponding MAC CE or padding as described in Tables 6.2.1-1 and 6.2.1-2 (of 3GPP TS 38.321 V15.3.0) for downlink-shared channel (DL-SCH) and uplink-shared channel (UL-SCH) respectively. There is one LCID field per MAC subheader. The LCID field size is 6 bits. The L field refers to Length field and indicates the length of the corresponding MAC SDU or variable-sized MAC CE in bytes. There is one L field per MAC subheader except for subheaders corresponding to fixed-sized MAC CEs, padding, and MAC SDUs containing UL CCCH. The size of the L field is indicated by the F field. The F field refers to format field and indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field. The R field refers to reserved bit and is set to zero.

The following two tables show the values of the defined LCID for DL-SCH and UL-SCH in 3GPP TS 38.321 V15.3.0 (also simply referred to as Release 15 or Rel-15 hereinafter) respectively.

TABLE 1

Values of LCID for DL-SCH

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |

TABLE 1-continued

Values of LCID for DL-SCH

| Index | LCID values |
|---|---|
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

TABLE 2

Values of LCID for UL-SCH

| Index | LCID values |
|---|---|
| 0 | CCCH of size 64 bits |
| 1-32 | Identity of the logical channel |
| 33-51 | Reserved |
| 52 | CCCH of size 48 bits |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

In Rel-15, there are up to 64 logical channels that can be configured for a UE in access interface. This number is sufficient for data transmission requirements between a UE and a gNB since it can be assumed given the fact that a typical UE does not have so many different services configured at the same time. However, in an IAB network, an intermediate IAB node may forward data for several descendant IAB nodes, where each descendant IAB node itself may serve hundreds of UEs. In such case, 64 logical channels are no longer enough, especially in a case that the one-to-one mapping option is applied for the correspondence between UE DRBs and IAB RLC-channels. Hence, it would be desirable to extend the logical channel (LCH) space and the logical channel group (LCG) space for IAB network. To enhance the number of logical channels for a backhaul link, it would be desirable to extend the logical channel identity (LCID) space in the MAC subheader and design new MAC subheader for IAB network.

The present disclosure proposes improved solutions for communication of MAC PDU. These solutions may be applied to a wireless communication system including a terminal device and an IAB node which may be an IAB donor or child node. The terminal device can communicate through a radio access communication link with the IAB node. The communications may be performed between the terminal device and the IAB node according to any suitable communication standards and protocols. The terminal device may also be referred to as, for example, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Now, several embodiments will be described to explain the improved solutions. These embodiments will be mainly focused on two aspects: 1) how does an MAC transmitter entity indicate to an MAC receiver entity that an LCID extension is applied; 2) the new formats of the MAC subheaders in case the extension is applied.

As a first embodiment, one R bit in the first octet of the MAC subheader (according to Rel-15 definition) may be used to indicate whether it is a new MAC subheader (i.e. LCID field is extended) or a Rel-15 MAC subheader. In Rel-15, R must be set to "0". Thus, in this embodiment, when R is set to "1", it means that the associated MAC subheader includes an extended LCID field. If the new MAC subheader is used, both the transmitting (Tx) and receiving (Rx) MAC entities may encode/decode the MAC subheader based on the extended LCID field size and its position in the MAC subheader. There may be three options to carry the new LCID field.

As the first option, the F bit is not changed, the new LCID field is enlarged by one (or two) additional byte(s) and the L field is still placed immediately after the LCID field. Optionally, R bits may be defined in the extended field if the extended bits are not fully occupied for the new LCID. FIGS. 7A and 7B show such an example, where FIG. 7A shows the case with a new LCID field and a single byte L field and FIG. 7B shows the case with a new LCID field and a two-byte L field. The new LCID is extended from 6 consecutive bits to 14 consecutive bits. The "part 1" may comprise of the most significant bits (MSBs) while the "part 2" may comprise of the least significant bits (LSBs). Alternatively, the "part 1" may comprise of the LSBs while the "part 2" may comprise of the MSBs. The new LCID may be the compound of part 1 and part 2. As an exemplary example, the part 2 may be n (n>=1) bytes. Optionally, the value of n may be configured by the network. The configuration of n may be UE/IAB node specific or cell specific. The exact value of n may be determined by the network based on criteria such as load, or QoS requirements of configured services, etc.

As the second option, the F bit is not changed, the new LCID field is extended by one (or two) additional byte(s) and the increased LCID part (one-byte) is placed immediately after the L field. FIGS. 8A and 8B show such an example, where FIG. 8A shows the case with a new LCID field and one-byte L field and FIG. 8B shows the case with a new LCID field and a two-byte L field. As shown, the increased/added LCID part (i.e. new LCID part 2) is placed after the L field. In this option, the L value indicates the total length including the new LCID part 2 as well as the SDU. The MAC entity may always assume a fixed size for new LCID part 2 being included in the total length. Similar as the first option, the exact size of the extended field may be configured by the network per UE/IAB node/cell.

Figure 9:
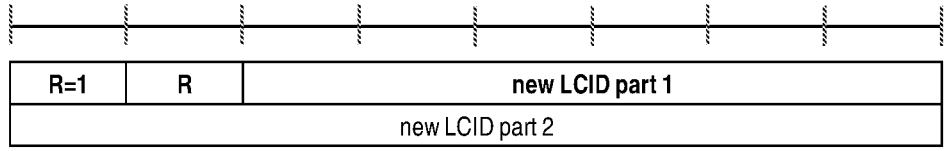
FIG. 9 shows an example of MAC subheader for the first embodiment.

The first or second option may also be applied to MAC subheader without L field, i.e. the MAC subheader for fixed sized MAC CE, padding, and an MAC SDU containing UL CCCH. FIG. 9 shows such an example.

Figure 10:
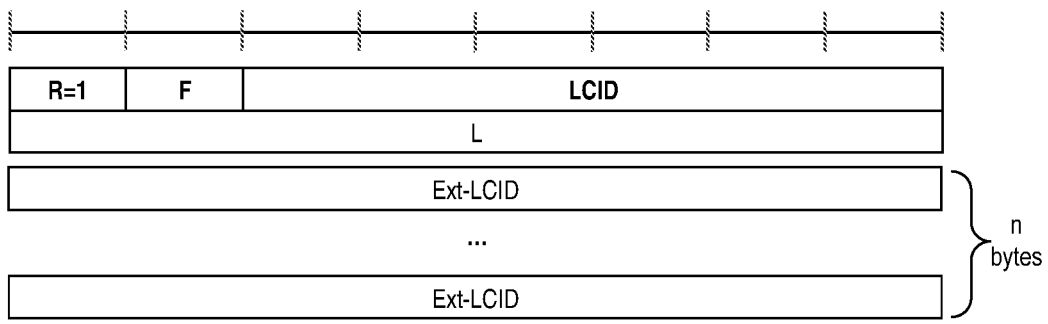
FIG. 10 shows an example of MAC subheader for the first embodiment.

As the third option, the Rel-15 LCID field is ignored by the receiver and a new LCID field (Ext-LCID) is introduced which may consist of n bytes, as shown in FIG. 10. The value of n may be hardcoded in the specifications. Alternatively, it may be dynamically configured by the network. As an example, the Rel-15 LCID field may indicate the value of n.

As a second embodiment, a specific range of LCID values (e.g., defined from the reserved LCID values in Rel-15 MAC specification, see Tables 1 and 2) may be defined to indicate whether a new LCID field is present. The length of the new LCID field may be also indicated.

For example, a receiver node may first derive a LCID value assuming a Rel-15 MAC subheader is used. If the LCID value is not any of the predefined specific values to indicate the presence of a new MAC subheader, the receiver node can determine this MAC subheader is a Rel-15 MAC subheader. Otherwise, the receiver node can determine that the new MAC subheader is used and further determine which new MAC subheader is used according to the predefined correspondence (or mapping) between the special LCID value and the MAC subheader format.

Figure 11A:
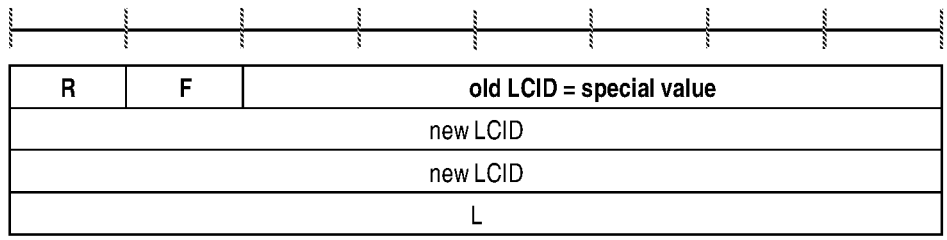
FIGS. 11A-11B show an example of MAC subheaders for the second embodiment.
Figure 11B:
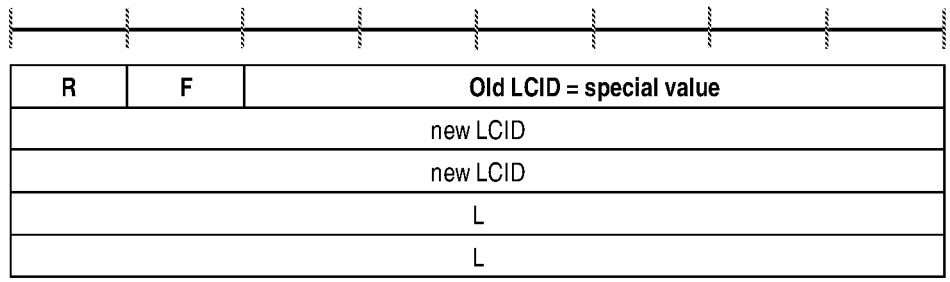
Figure 12A:
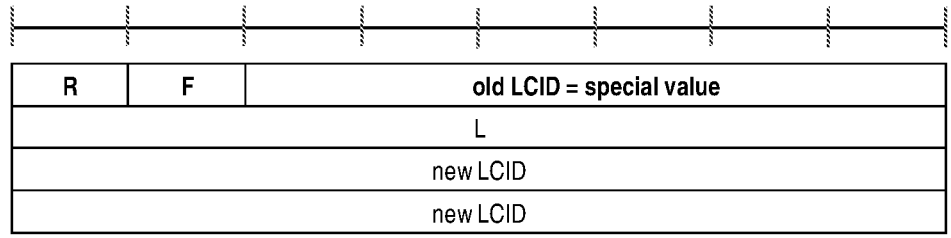
FIGS. 12A-12B show an example of MAC subheaders for the second embodiment.
Figure 12B:
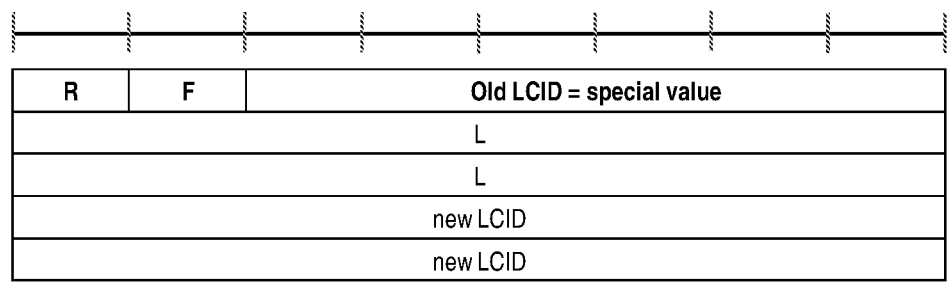
Figure 13:
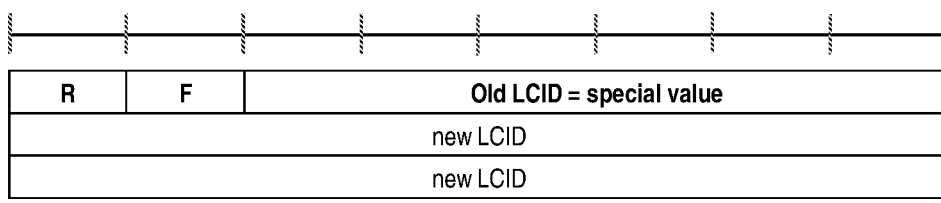
FIG. 13 shows an example of MAC subheader for the second embodiment.

Similar as the first embodiment, the increased LCID part (i.e. new LCID part 2) can be placed either before the L field (see FIGS. 11A and 11B) or after the L field (see FIGS. 12A and 12B). FIG. 13 shows an example where the MAC subheader does not carry L field, i.e. the MAC subheader for fixed sized MAC CE, padding, and an MAC SDU containing UL CCCH. If the new LCID field is placed after the L field, the L value indicates the total length including the new LCID field and the corresponding MAC CE, padding or the MAC SDU. It should be noted that in the above first and second embodiment, the new LCID part 2 may be of fixed size but the fixed size may be smaller or greater than 8 bits. Optionally, the size may be configured by the network per UE/IAB node/cell.

Figure 14A:
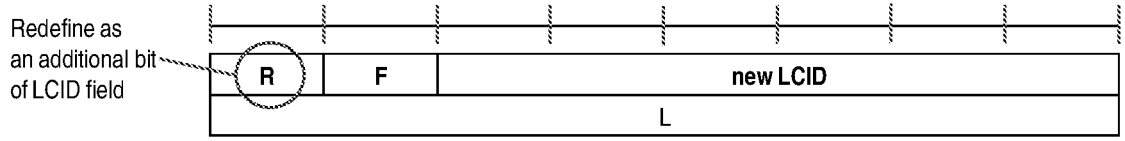
FIGS. 14A-14C show an example of MAC subheaders for the third embodiment.
Figure 14B:
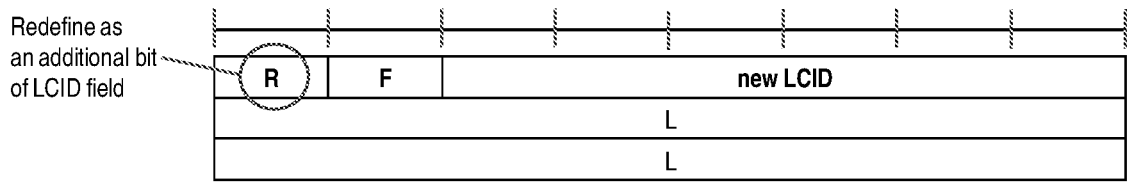
Figure 14C:
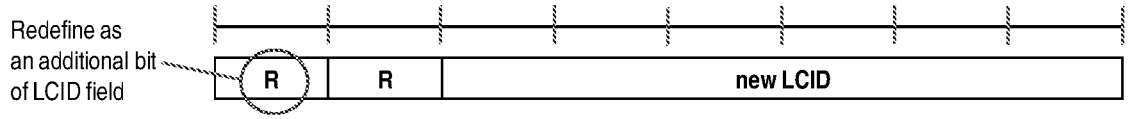

As a third embodiment, a minor LCID extension may be applied. As an example, the R bit in the first byte of the Rel-15 MAC subheader is redefined as an extended bit of the new LCID field (or as an extra bit added to the LCID field). According to this enhancement, the new LCID field comprises 7 bits. FIGS. 14A-14C show such examples. As another example, the F bit and the redefined R bit may switch the position to allow consecutive bits for the new LCID field (i.e. the last 7 bits of the first byte is used for LCID field and the first bit is used for F field).

Similar as the first embodiment, the R bit may be used to indicate whether an LCID extension is applied in the third embodiment. For example, when the R bit takes the value of zero, it indicates a Rel-15 MAC subheader. When the R bit takes the value of one, it indicates a new MAC subheader. In this case, the R bit with the value of one and the Rel-15 LCID bits jointly indicate the LCID value carried by the new MAC subheader.

Figure 15A:
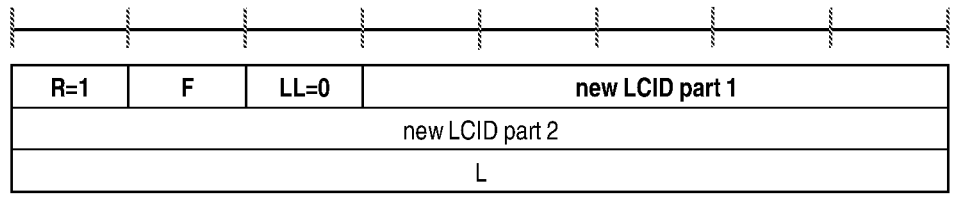
FIGS. 15A-15B show an example of MAC subheaders for the fourth embodiment.
Figure 15B:
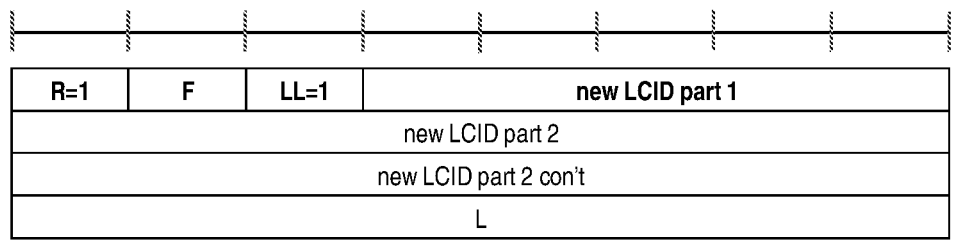
Figure 16A:
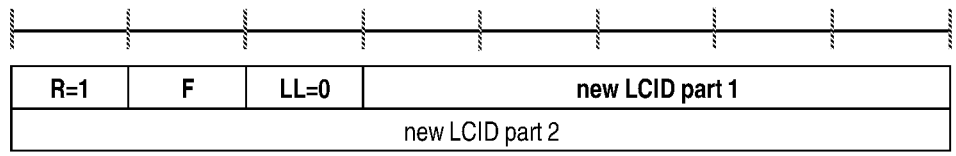
FIGS. 16A-16B show an example of MAC subheaders for the fourth embodiment.
Figure 16B:
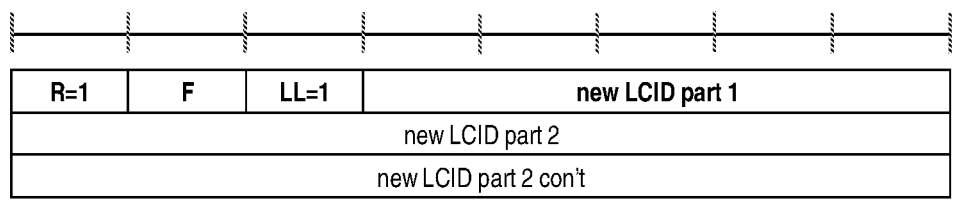

As a fourth embodiment, the R bit in the first byte of the Rel-15 subheader may be redefined to indicate presence of the new MAC subheader and the new MAC subheader comprises an LCID length (LL) field to indicate the length of the new LCID part 1 and the new LCID part 2. FIGS. 15A-15B show the example with L field and FIGS. 16A-16B show the example without L field. Like previous embodiments, the new LCID part 2 may be placed behind the L field although the corresponding figures are omitted for brevity. For example, the LL field may be one or more bits depending on the size of the new LCID part 2. For instance, for one-bit LL field, 0 indicates one-byte part 2 while 1 indicates two-byte part 2. The reverse values may also be used. Similarly, for two-bit LL field, 00 indicates one-byte part 2, 01 indicates two-byte part 2, 10 indicates three-byte part 2, and 11 indicates four-byte part 2.

Optionally, in any of the above embodiments, the format of the new MAC subheader may be determined or configured depending on which mapping option (i.e. the mapping option between UE DRBs and RLC-channels, e.g. one to one mapping or many to one mapping) is adopted in the cell/TAB node. Optionally, in any of the above embodiments, when the LCID value to be carried by an MAC subheader is smaller than 64, the ordinary MAC subheader is used. On the other hand, when the LCID value to be carried by an MAC subheader is larger than 63, the new MAC subheader with an extended LCID field is used. Optionally, in any of the above embodiment, the LCID value carried by a new MAC subheader may be 64 plus the actual indicated value of the new LCID field.

Figure 17:
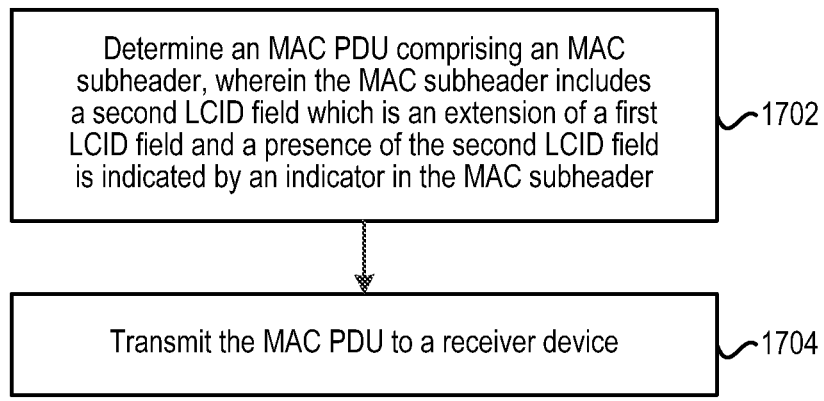
FIG. 17 is a flowchart illustrating a method implemented at a transmitter device according to an embodiment of the disclosure.

Hereinafter, the solutions of the disclosure will be further described with reference to FIGS. 17-27. FIG. 17 is a flowchart illustrating a method implemented at a transmitter device according to an embodiment of the disclosure. For example, the transmitter device may be an TAB node such as an TAB donor or child node. It is also possible that the transmitter device is a terminal device. At block 1702, the transmitter device determines an MAC PDU comprising an MAC subheader. The MAC subheader includes a second LCID field which is an extension of a first LCID field and a presence of the second LCID field is indicated by an indicator that is included in the MAC subheader. For example, the first LCID field may also be called a first type of LCID field and may refer to a legacy (or ordinary) LCID field as described in paragraph 102 and Table 1 and 2. It may indicate a first maximum LCID value. The second LCID field may also be called a second type of LCID field and may refer to an extended LCID field. The second LCID field may indicate a second maximum LCID value greater than the first maximum LCID value such that the indicated LCID value range can be increased or extended.

For example, the transmitter device may determine whether or not to include the second LCID field into an MAC subheader. Suppose the first LCID field has a length of n bits, where n is an integer greater than one. Then, if an LCID value to be carried by the MAC subheader is greater than $2^n-1$, it may be determined to include the second LCID field into the MAC subheader. In this case, the MAC subheader may be called a second MAC subheader or a second type of MAC subheader which may refer to an extended MAC subheader. Since the MAC subheader in the MAC PDU determined at block 1702 includes the second LCID field, it belongs to the second type of MAC subheader. On the other hand, if an LCID value to be carried by the MAC subheader is smaller than $2^n$, it may be determined not to include the second LCID field into the MAC subheader. In this case, the MAC subheader including the first LCID field but including no second LCID field may be called a first MAC subheader or a first type of MAC subheader which may refer to a legacy (or ordinary) MAC subheader.

As an exemplary example, the first type of MAC subheader may include a reserved bit, a format field, the first LCID field and a length field which are disposed in this order, in a case that there is a need to indicate the length of the payload following the MAC subheader. The reserved bit has a default value of zero. The length field indicates the length of the payload such as MAC SDU, MAC CE, or the like. The format field indicates the length of the length field. On the other hand, the first type of MAC subheader may include reserved bits and the first LCID field which are disposed in this order, in a case that there is no need to indicate the length of the payload following the MAC subheader. The first reserved bit has a default value of zero. The remaining reserved bit(s) substitute the format field. For instance, when the integer n mentioned above takes the value of 6, the first type of MAC subheader may be a Rel-15 MAC subheader.

For example, the indicator indicating the presence of the second LCID field may be another field in the MAC subheader (different than the second LCID field). As a first option, the another field may be a reserved bit which is redefined as the indicator. For instance, the redefined reserved bit may use a first predefined value to indicate the presence of the second LCID field. Specifically, one of two binary values (0 and 1) may be used as the first predefined value and the other binary value may be used to indicate non-presence of the second LCID field. In the exemplary example described in the above paragraph, the default value of zero may be used as the first predefined value. As a second option, the another field may be the first LCID field that has a second predefined value to indicate the presence of the second LCID field. For instance, there may be one or more reserved values in the first LCID value range indicated by the first LCID field. Then, any one of the one or more reserved values may be used as the second predefined value.

In the above first option, there may be three alternatives. In the first alternative, the MAC subheader includes no first LCID field, and the second LCID field occupies a position of the first LCID field and one or more additional bits. For instance, the number of the one or more additional bits may be predefined in the transmitter device or preconfigured from outside. Such number may be alternatively determined by a first length indicator (similar to the LL field shown in FIGS. 15A-15B and 16A-16B) that is included in the second LCID field and indicates a length of the second LCID field. For instance, the one or more additional bits may be disposed immediately after the position of the first LCID field, or immediately after a second length indicator (similar to the L field shown in FIGS. 8A-8B) that indicates a total length of the one or more additional bits and an SDU or a CE of the MAC PDU. Optionally, bits disposed in the position of the first LCID field may be most significant bits (MSBs) of the second LCID field and the one or more additional bits may be least significant bits (LSBs) of the second LCID field. It is also possible that bits disposed in the position of the first LCID field may be LSBs and the one or more additional bits may be MSBs.

In the second alternative, the MAC subheader includes the first LCID field, and the second LCID field occupies one or more additional bits. In this case, the first LCID field may be configured such that it is to be ignored by the receiver device in response to the reserved bit having the first predefined value. Thus, the number of the one or more additional bits may be predefined in the transmitter device or preconfigured from outside. Alternatively, such number may be indicated by the first LCID field with a third predefined value. For instance, there may be one or more reserved values in the first LCID value range indicated by the first LCID field. Then, any one of the one or more reserved values may be used as the third predefined value. Similar as the first alternative, the one or more additional bits may be disposed immediately after the position of the first LCID field, or immediately after a second length indicator (similar to the L field shown in FIG. 10) that indicates a total length of the one or more additional bits and an SDU or a CE of the MAC PDU.

In the third alternative, the second LCID field occupies a position of the first LCID field and the reserved bit is redefined as a portion of the second LCID field. In this case, an LCID value carried by the MAC subheader is indicated jointly by bits disposed in the position of the first LCID field and the redefined reserved bit. For instance, the position of the redefined reserved bit may be separated from the position of the first LCID filed. Alternatively, the redefined reserved bit may be disposed immediately before the position of the first LCID filed. In the above exemplary example (where the first type of MAC subheader includes a reserved bit, a format field, the first LCID field and a length field), the reserved bit may switch the position with the format field in the second type of MAC subheader.

In the above second option, the MAC subheader includes the first LCID field, and the second LCID field occupies one or more additional bits. For instance, as mentioned above, there may be one or more reserved values in the first LCID value range indicated by the first LCID field. Then, any one of the one or more reserved values may be used as the second predefined value to indicate the presence of the second LCID field. Optionally, any one of the one or more reserved values may also be used to indicate different format (including the number of the one or more additional bits) of the MAC subheader. The number of the one or more additional bits may be alternatively predefined in the transmitter device or preconfigured from outside. Similar as the first alternative, the one or more additional bits may be disposed immediately after the first LCID field, or immediately after a second length indicator (similar to the L field shown in FIGS. 12A-12B) that indicates a total length of the one or more additional bits and an SDU or a CE of the MAC PDU.

Note that in any one of the above two options, if a length of the first LCID field is n bits where n is an integer greater than one, then an LCID value carried by the MAC subheader may be an value indicated by the second LCID field plus $2^n$. In this way, the LCID value range carried by the second type of MAC subheader can be increased. For example, as mentioned above, the integer n may take the value of 6. At block 1704, the transmitter device transmits the MAC PDU to a receiver device. For example, the receiver device may be an IAB node such as an IAB donor or child node. It is also possible that the receiver device is a terminal device. Although blocks 1702 and 1704 are described as two separate blocks, it is also possible that block 1702 is implemented as part of block 1704.

Figure 18:
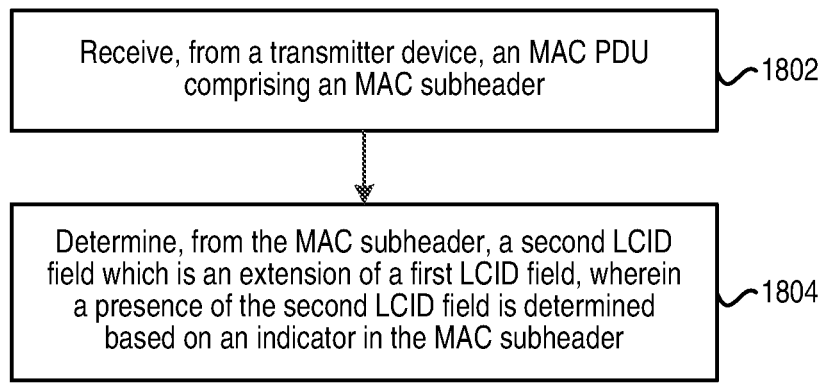
FIG. 18 is a flowchart illustrating a method implemented at a receiver device according to an embodiment of the disclosure.

FIG. 18 is a flowchart illustrating a method implemented at a receiver device according to an embodiment of the disclosure. For example, the receiver device may be an IAB node such as an IAB donor or child node. It is also possible that the receiver device is a terminal device. At block 1802, the receiver device receives, from a transmitter device, an MAC PDU comprising an MAC subheader. The MAC subheader includes a second LCID field which is an extension of the first LCID field. For example, the transmitter device may be an IAB node such as an IAB donor or child node. It is also possible that the transmitter device is a terminal device. The details about the MAC subheader and the two LCID fields have been described above and are omitted here for brevity.

At block 1804, the receiver device determines, from the MAC subheader, the second LCID field. A presence of the second LCID field is determined based on an indicator that is included in the MAC subheader. For example, the indicator may be another field in the MAC subheader (different than the second LCID field). As a first option, the another field may be a reserved bit which is redefined as the indicator. For instance, the redefined reserved bit may use a first predefined value to indicate the presence of the second LCID field. Specifically, one of two binary values (0 and 1) may be used as the first predefined value and the other binary value may be used to indicate non-presence of the second LCID field. Correspondingly, the presence of the second LCID field may be determined in response to the reserved bit having the first predefined value. As a second option, the another field may be the first LCID field that has a second predefined value to indicate the presence of the second LCID field. For instance, there may be one or more reserved values in the first LCID value range indicated by the first LCID field. Then, any one of the one or more reserved values may be used as the second predefined value. Correspondingly, the presence of the second LCID field may be determined in response to the first LCID field having the second predefined value.

In the above first option, there may be three alternatives for determining the second LCID field. In the first alternative, the MAC subheader includes no first LCID field, and the second LCID field occupies a position of the first LCID field and one or more additional bits. For instance, the number of the one or more additional bits may be predefined in the receiver device or preconfigured from outside. Such number may be alternatively determined by a first length indicator (similar to the LL field shown in FIGS. 15A-15B and 16A-16B) that is included in the first LCID field and indicates a length of the second LCID field. For instance, the one or more additional bits may be disposed immediately after the position of the first LCID field, or immediately after a second length indicator (similar to the L field shown in FIGS. 8A-8B) that indicates a total length of the one or more additional bits and an SDU or a CE of the MAC PDU. Optionally, bits disposed in the position of the first LCID field may be MSBs and the one or more additional bits may be LSBs. It is also possible that bits disposed in the position of the first LCID field may be LSBs and the one or more additional bits may be MSBs. Correspondingly, the second LCID field may be determined based on the above format of the MAC subheader.

In the second alternative, the MAC subheader includes the first LCID field, and the second LCID field occupies one or more additional bits. In this case, the first LCID field may be ignored by the receiver device in response to the reserved bit having the first predefined value. Thus, the number of the one or more additional bits may be predefined in the receiver device or preconfigured from outside. Alternatively, such number may be indicated by the first LCID field with a third predefined value. For instance, there may be one or more reserved values in the first LCID value range indicated by the first LCID field. Then, any one of the one or more reserved values may be used as the third predefined value. Similar as the first alternative, the one or more additional bits may be disposed immediately after the first LCID field, or immediately after a second length indicator (similar to the L field shown in FIG. 10) that indicates a total length of the one or more additional bits and an SDU or a CE of the MAC PDU. Correspondingly, the second LCID field may be determined based on the above format of the MAC subheader.

In the third alternative, the second LCID field occupies a position of the first LCID field and the reserved bit is redefined as a portion of the second LCID field. In this case, an LCID value carried by the MAC subheader is indicated jointly by bits disposed in the position of the first LCID field and the redefined reserved bit. For instance, the position of the redefined reserved bit may be separated from the position of the first LCID filed, or disposed immediately before the position of the first LCID filed. Correspondingly, the second LCID field may be determined based on the above format of the MAC subheader.

In the above second option, the MAC subheader includes the first LCID field, and the second LCID field occupies one or more additional bits. For instance, as mentioned above, there may be one or more reserved values in the first LCID value range indicated by the first LCID field. Then, any one of the one or more reserved values may be used as the second predefined value to indicate the presence of the second LCID field. Optionally, any one of the one or more reserved values may also be used to indicate different format (including the number of the one or more additional bits) of the MAC subheader. The number of the one or more additional bits may be alternatively predefined in the receiver device or preconfigured from outside. Similar as the first alternative, the one or more additional bits may be disposed immediately after the first LCID field, or immediately after a second length indicator (similar to the L field shown in FIGS. 12A-12B) that indicates a total length of the one or more additional bits and an SDU or a CE of the MAC PDU. Correspondingly, the second LCID field may be determined based on the above format of the MAC subheader.

Note that in any one of the above two options, if a length of the first LCID field is n bits where n is an integer greater than one, then an LCID value carried by the MAC subheader may be determined as an value indicated by the second LCID field plus $2^n$. For example, as mentioned above, the integer n may take the value of 6. Although blocks 1802 and 1804 are described as two separate blocks, it is also possible that block 1804 is implemented as part of block 1802. It should be also noted that two blocks shown in succession in the figures may, in fact, be executed substantially concurrently, or the blocks may sometimes be executed in the reverse order, depending upon the functionality involved.

Based on the above description, in at least one aspect, the present disclosure provides a method implemented in a communication system including a transmitter device and a receiver device. The method may comprise, at the transmitter device, determining an MAC PDU comprising an MAC subheader. The method may further comprise, at the transmitter device, transmitting the MAC PDU to the receiver device. The MAC subheader may include a second LCID field which is an extension of a first LCID field. A presence of the second LCID field may be indicated by an indicator that is included in the MAC subheader. The method may further comprise, at the receiver device, receiving, from the transmitter device, the MAC PDU comprising the MAC subheader. The method may further comprise, at the receiver device, determining, from the MAC subheader, the second LCID field. A presence of the second LCID field may be determined based on the indicator that is included in the MAC subheader.

Figure 19:
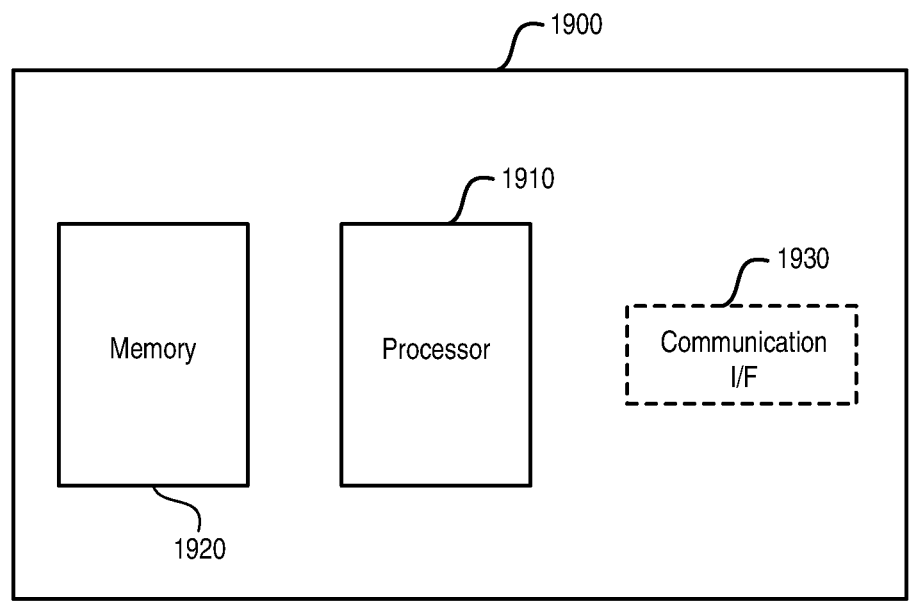
FIG. 19 is a block diagram showing an apparatus suitable for use in practicing some embodiments of the disclosure.

FIG. 19 is a block diagram showing an apparatus suitable for use in practicing some embodiments of the disclosure. For example, the transmitter device and receiver device described above may be implemented through the apparatus 1900. As shown, the apparatus 1900 may include a processor 1910, a memory 1920 that stores a program, and optionally a communication interface 1930 for communicating data with other external devices through wired and/or wireless communication.

The program includes program instructions that, when executed by the processor 1910, enable the apparatus 1900 to operate in accordance with the embodiments of the present disclosure, as discussed above. That is, the embodiments of the present disclosure may be implemented at least in part by computer software executable by the processor 1910, or by hardware, or by a combination of software and hardware.

The memory 1920 may be of any type suitable to the local technical environment and may be implemented using any suitable data storage technology, such as semiconductor based memory devices, flash memories, magnetic memory devices and systems, optical memory devices and systems, fixed memories and removable memories. The processor 1910 may be of any type suitable to the local technical environment, and may include one or more of general purpose computers, special purpose computers, microprocessors, digital signal processors (DSPs) and processors based on multi-core processor architectures, as non-limiting examples.

Figure 20:
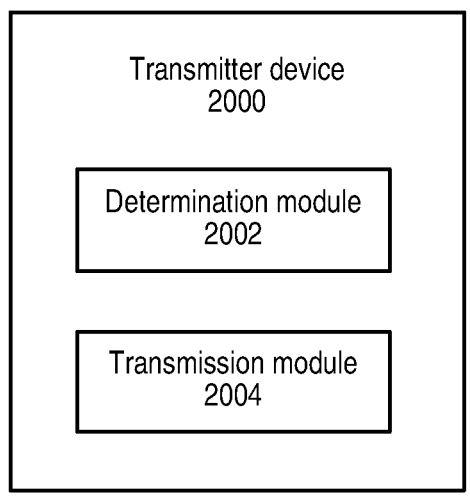
FIG. 20 is a block diagram showing a transmitter device according to an embodiment of the disclosure.

FIG. 20 is a block diagram showing a transmitter device according to an embodiment of the disclosure. As shown, the transmitter device 2000 comprises a determination module 2002 and a transmission module 2004. The determination module 2002 may be configured to determine an MAC PDU comprising an MAC subheader. The MAC subheader includes a second LCID field which is an extension of a first LCID field and a presence of the second LCID field is indicated by an indicator that is included in the MAC subheader. The transmission module 2004 may be configured to transmit the MAC PDU to a receiver device.

Figure 21:
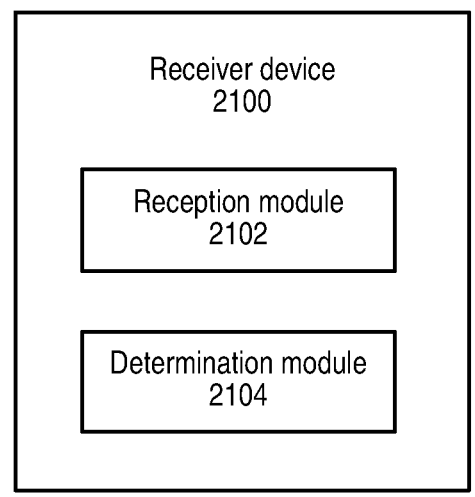
FIG. 21 is a block diagram showing a receiver device according to an embodiment of the disclosure.

FIG. 21 is a block diagram showing a receiver device according to an embodiment of the disclosure. As shown, the receiver device 2100 comprises a reception module 2102 and a determination module 2104. The reception module 2102 may be configured to receive, from a transmitter device, an MAC PDU comprising an MAC subheader. The determination module 2104 may be configured to determine, from the MAC subheader, a second LCID field which is an extension of a first LCID field. A presence of the second LCID field is determined based on an indicator that is included in the MAC subheader. The modules described above may be implemented by hardware, or software, or a combination of both.

Figure 22:
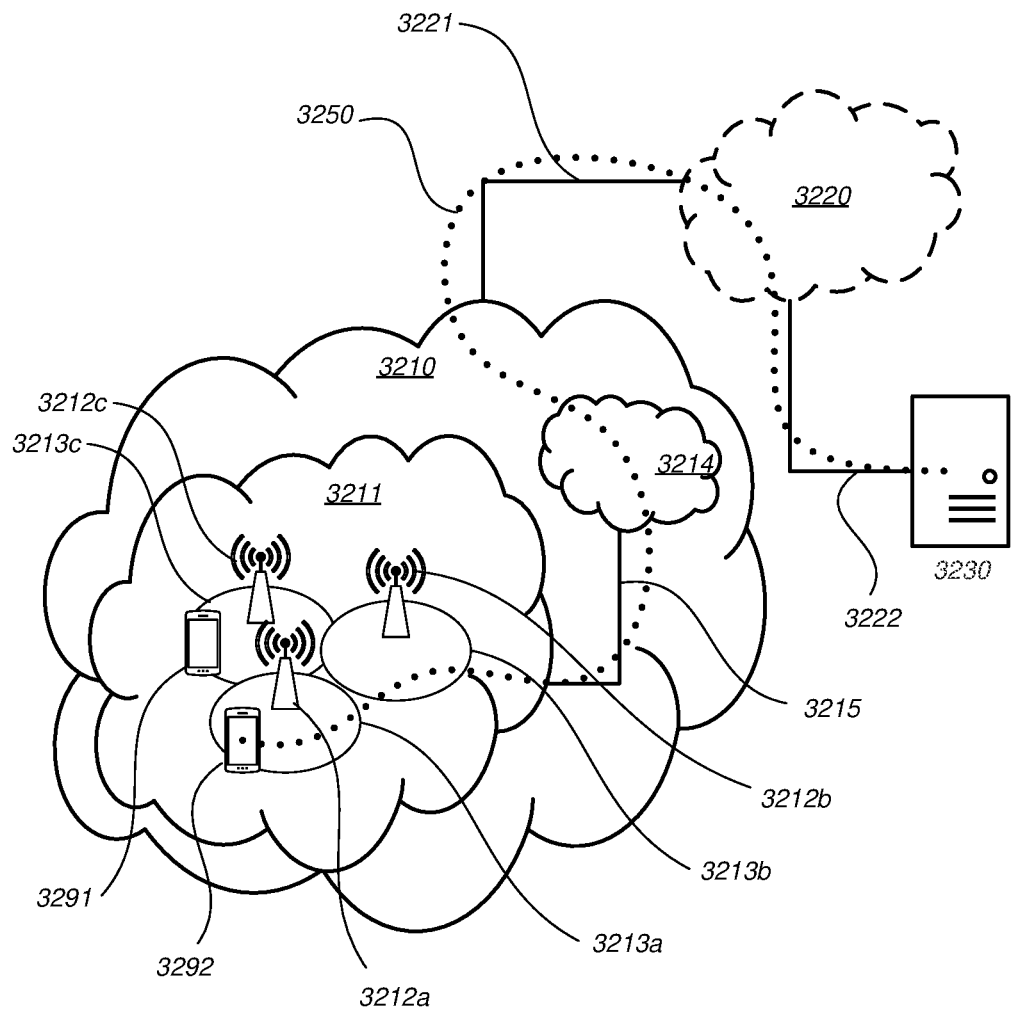
FIG. 22 is a diagram showing a telecommunication network connected via an intermediate network to a host computer in accordance with some embodiments.

With reference to FIG. 22, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 22 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 23. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 23) served by base station 3320. Communication interface 3326 may be configured to facilitate connection 3360 to host computer 3310. Connection 3360 may be direct or it may pass through a core network (not shown in FIG. 23) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 23:
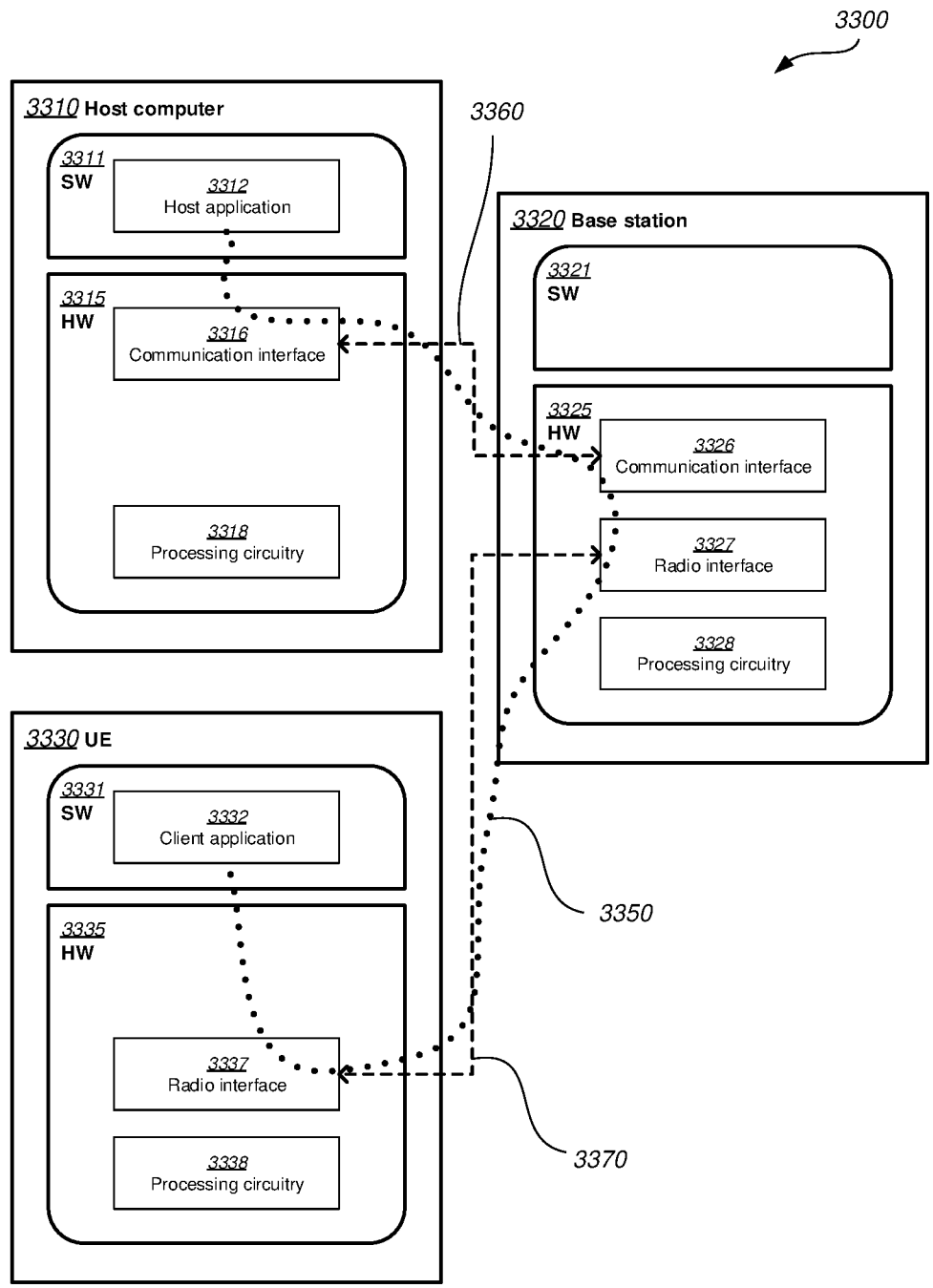
FIG. 23 is a diagram showing a host computer communicating via a base station with a user equipment in accordance with some embodiments.

It is noted that host computer 3310, base station 3320 and UE 3330 illustrated in FIG. 23 may be similar or identical to host computer 3230, one of base stations 3212a, 3212b, 3212c and one of UEs 3291, 3292 of FIG. 22, respectively. This is to say, the inner workings of these entities may be as shown in FIG. 23 and independently, the surrounding network topology may be that of FIG. 22.

In FIG. 23, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 24:
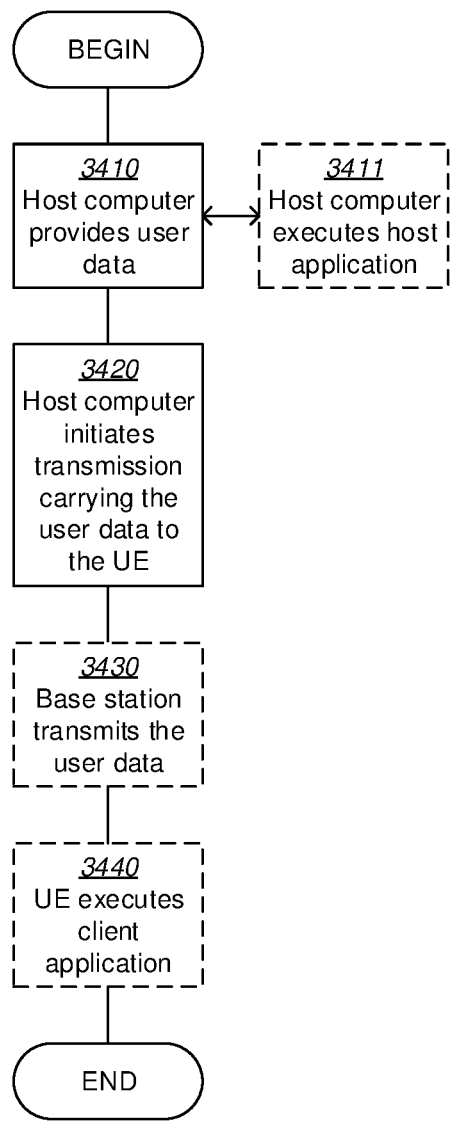
FIG. 24 is a flowchart illustrating a method implemented in a communication system in accordance with some embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 25:
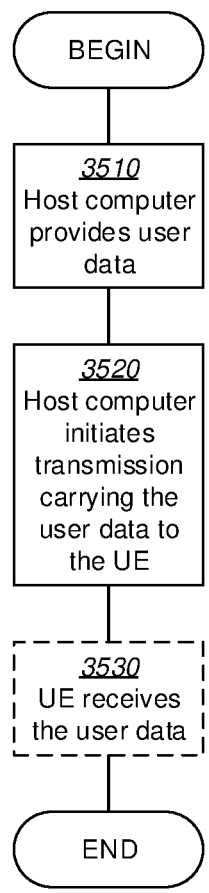
FIG. 25 is a flowchart illustrating a method implemented in a communication system in accordance with some embodiments.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 26:
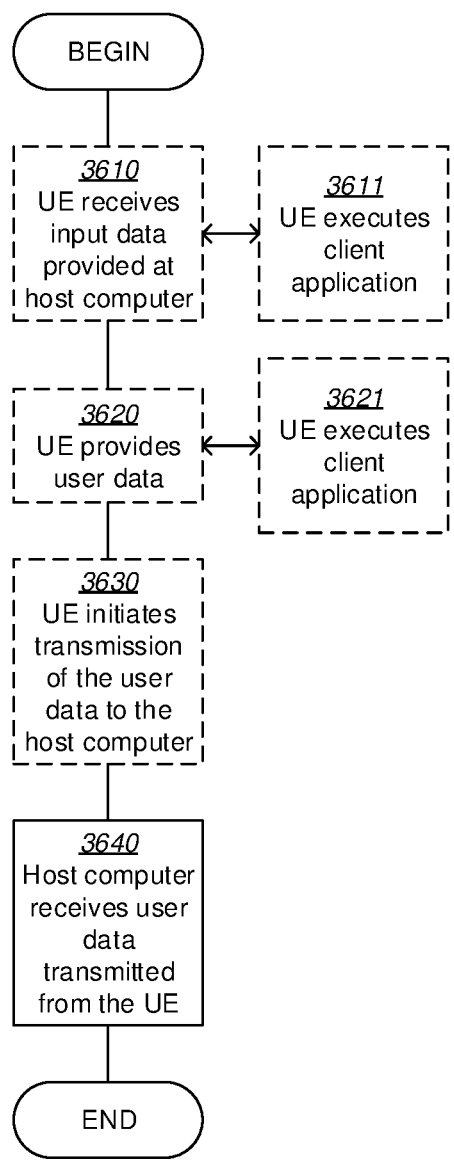
FIG. 26 is a flowchart illustrating a method implemented in a communication system in accordance with some embodiments.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 27:
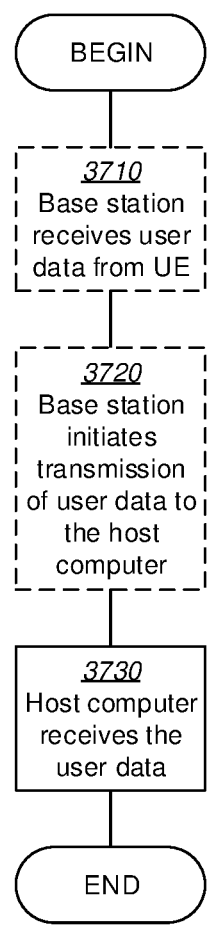
FIG. 27 is a flowchart illustrating a method implemented in a communication system in accordance with some embodiments.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a transmitter device, the method comprising:
 determining a media access control (MAC) protocol data unit (PDU) comprising an MAC subheader; and
 transmitting the MAC PDU to a receiver device,
 wherein the MAC subheader includes a second logical channel identity (LCID) field which is an extension of a first LCID field, and wherein a presence of the second LCID field is indicated by an indicator that is included in the MAC subheader, wherein the indicator is another field in the MAC subheader, wherein the another field is a reserved bit which is redefined as the indicator to indicate the presence of the second LCID field.

2. The claim according to claim 1, wherein the redefined reserved bit uses a first predefined value to indicate the presence of the second LCID field.

3. The method according to claim 1, wherein the another field is the first LCID field that has a second predefined value to indicate the presence of the second LCID field.

4. The method according to claim 1, wherein the MAC subheader includes no first LCID field, and the second LCID field occupies a position of the first LCID field and one or more additional bits.

5. The method according to claim 4, wherein a number of the one or more additional bits is predefined in the transmitter device or preconfigured from outside.

6. The method according to claim 4, wherein the second LCID field includes a first length indicator that indicates a length of the second LCID field.

7. The method according to claim 4, wherein the one or more additional bits are disposed immediately after the position of the first LCID field; or
 wherein the one or more additional bits are disposed immediately after a second length indicator that indicates a total length of the one or more additional bits and a service data unit, SDU, or a control element, CE, of the MAC PDU.

8. The method according to claim 4, wherein bits disposed in the position of the first LCID field are most significant bits, MSBs, of the second LCID field and the one or more additional bits are least significant bits, LSBs, of the second LCID field.

9. The method according to claim 4, wherein bits disposed in the position of the first LCID field are LSBs of the second LCID field and the one or more additional bits are MSBs of the second LCID field.

10. The method according to claim 1, wherein the MAC subheader includes the first LCID field, and the second LCID field occupies one or more additional bits.

11. The method according to claim 10, wherein a number of the one or more additional bits is indicated by the first LCID field with a third predefined value, or is predefined in the transmitter device or preconfigured from outside.

12. The method according to claim 10, wherein the first LCID field is configured such that it is to be ignored by the receiver device in response to a reserved bit having a first predefined value.

13. The method according to claim 1, wherein the second LCID field occupies a position of the first LCID field and the reserved bit is redefined as a portion of the second LCID field; and
 wherein an LCID value carried by the MAC subheader is indicated jointly by bits disposed in the position of the first LCID field and the redefined reserved bit.

14. The method according to claim 13, wherein the position of the redefined reserved bit is separated from the position of the first LCID filed; or
 wherein the position of the redefined reserved bit is disposed immediately before the position of the first LCID filed.

15. The method according to claim 1, wherein a length of the first LCID field is n bits where n is an integer greater than one; and
 wherein the MAC PDU comprising the MAC subheader is determined when an LCID value to be carried by the MAC subheader is greater than $2^n-1$.

16. The method according to claim 15, wherein an LCID value carried by the MAC subheader is a value indicated by the second LCID field plus $2^n$.

17. A method implemented at a receiver device, the method comprising:
 receiving, from a transmitter device, a media access control (MAC) protocol data unit (PDU) comprising an MAC subheader; and
 determining, from the MAC subheader, a second logical channel identity (LCID) field which is an extension of a first LCID field,
 wherein a presence of the second LCID field is determined based on an indicator that is included in the MAC subheader, wherein the indicator is another field in the MAC subheader wherein the another field is a reserved bit which is redefined as the indicator to indicate the presence of the second LCID field.

18. A transmitter device comprising:
 at least one processor; and
 at least one memory, the at least one memory containing instructions executable by the at least one processor, whereby the transmitter device is operative to:
 determine a media access control (MAC) protocol data unit (PDU) comprising an MAC subheader; and
 transmit the MAC PDU to a receiver device,
 wherein the MAC subheader includes a second logical channel identity (LCID) field which is an extension of a first LCID field, and wherein a presence of the second LCID field is indicated by an indicator that is included in the MAC subheader, wherein the indicator is another field in the MAC subheader, wherein the another field is a reserved bit which is redefined as the indicator to indicate the presence of the second LCID field.

* * * * *